May 11, 1954     L. H. ATKINSON     2,678,077
VEHICLE TIRE VALVE PROTECTOR
Filed April 4, 1951
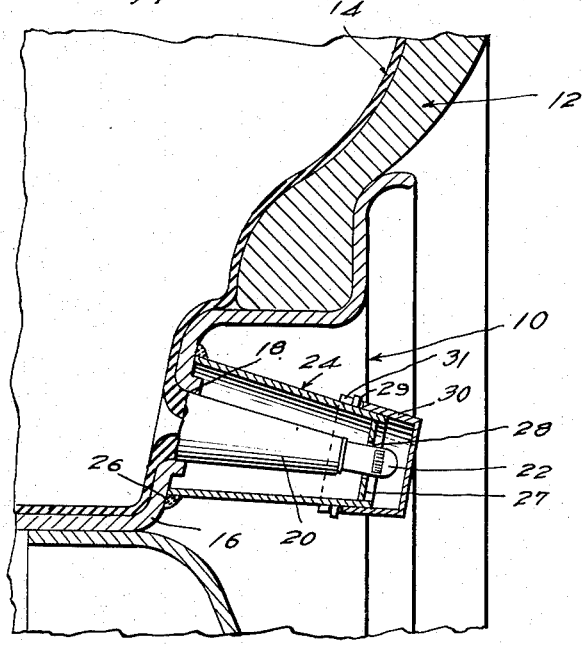
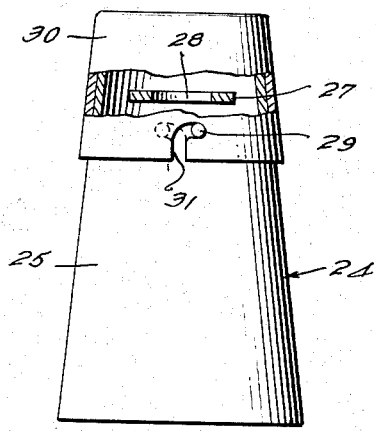
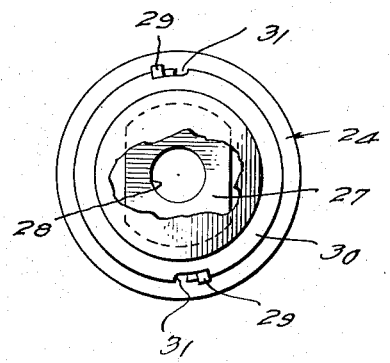
INVENTOR.
Linwood H. Atkinson
BY
Wilfred E. Lawson
ATTORNEY Patented May 11, 1954

2,678,077

UNITED STATES PATENT OFFICE 2,678,077

VEHICLE TIRE VALVE PROTECTOR

Linwood H. Atkinson, Hillman, Mich.

Application April 4, 1951, Serial No. 219,181

1 Claim. (Cl. 152—428)

This invention relates generally to motor vehicle wheels and is directed particularly to means for protecting the stems or air admitting valves of tire inner tubes.

It frequently occurs that the valves of the tire inner tubes of motor vehicles become damaged when the vehicle tire is run through mud or ice or over other terrain, where there is a possibility of objects on the ground striking the tire valve, and in this manner the tire valves develop leaks so that the tube looses the air therein.

It is a particular object of the present invention to provide a protecting means for the tire valves whereby such valves will be effectively shielded or housed and cannot be struck or damaged.

Another object of the invention is to provide a tire or inner tube valve protector which will not only shield the valve against damage but will function as a supporting means for the outer end of the valve, such supported outer end being effectively shielded and protected by a removable cover, whereby the valve cap can be easily and quickly reached and removed when it becomes necessary to connect an air hose with the valve stem.

The invention wil be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a detail section through a portion of a motor vehicle tire supporting rim, a tire and tube, showing the air valve stem and the protective housing of the present invention in shielding relation therewith.

Figure 2 is a view in side elevation of the housing per se, portions being broken away to show details of construction.

Figure 3 is a view looking at the outer end of the valve stem protector or shield, with portions broken away.

Referring now more particularly to the drawing, the numeral 10 generally designates a portion of a motor vehicle wheel rim on which the vehicle tire is mounted, a portion only of a tire being here shown and generally designated 12.

The numeral 14 designates a portion of an inner tube which is within the tire or tire casing 12.

In the present day vehicles the tire rim is provided with a central channel 16 which has a side wall provided with an opening 18 through which projects the valve stem 20 which is joined to the inner tube 14. The stem thus extends outwardly more or less axially with respect to the vehicle wheel instead of extending radially inwardly as in older types of wheel construction, as a result of which the valve stem 20 often becomes damaged by being struck or by striking some object at the side of the wheel.

The numeral 22 designates the removable cap which is a conventional part of the valve stem and which is taken off to permit the application to the outer end of the stem of an air hose.

In accordance with the present invention there is provided a hollow guard housing which is generally designated 24 which is secured to the outer side of the part 16 of the wheel rim through which the valve stem opening 18 is formed, to extend outwardly in the direction which the valve stem 20 extends when it is positioned in the opening 18 in the customary manner. Such housing is here shown as comprising an elongate frusto-conical shell, the larger or base end of which is secured to the outer side of the apertured portion 16 of the rim, concentrically with the opening 18.

In the arrangement here shown, the large or base end of the frusto-conical housing body, designated 25, is secured to the part 16 of the rim by welding, as indicated at 26 but it is to be understood that other means may be employed for securing the housing to the rim body as by screw threading or by punching the rim and drawing the metal outwardly into the desired conical form.

The body 25 of the housing is of an overall length approximately equal to the valve stem 20 as shown and at the outer or smaller end of the body 25 there is secured the transverse wall plate 27 having an aperture 28 which is in alignment with the opening 18 to snugly receive the valve stem cap 22. By this arrangement the valve stem is not only protected against injury but it is held securely in position.

Adjacent to the outer end of the housing body 25, the body is provided with the outwardly projecting diametrically oppositely positioned lugs or ears 29 to facilitate the detachable engagement over the open outer end of the body 25 of a cover cap 30. As shown, this cap is of tapered form and in the inner edge of the side wall there are provided at diametrically opposite positions, the bayonet slots 31 which receive the ears or lugs 29 as illustrated in Figure 2. Thus it will be seen that when the cap 30 is in place its tapered form causes it to snugly receive the tapered outer end of the housing body 25 and when the lugs 29 are engaged in the angled inner end portions of the bayonet slots, the cover cap 30 will be firmly locked in shielding position over the outer end of the valve stem cap 22 and in spaced relation therewith as shown in Figure 1 so that there is no pressure applied to the valve stem or the cap.

From the foregoing it will be readily apparent that there is provided by the present invention an effective means of preventing the valve stem from becoming damaged or bent through contact with objects engaged by the wheel and at the same time the protecting device will not interfere in any way with the insertion of the valve stem or its removal when it becomes necessary to remove the tire from a wheel and it will not interfere in any manner with the application of an air hose to the stem.

I claim:

In combination with the supporting rim of a pneumatic tire and the inflation valve of the inner tube thereof, a protective housing for said valve comprising a hollow frusto-conical element having its larger end secured to the rim about the valve opening therein for the projection of the valve and its removable cap centrally through the same, an apertured plate secured diametrically of and inwardly from the smaller outer end of said housing to receive the capped end of the valve and thereby maintain the valve in centered relation with respect to the housing, a cover cap engaged over the smaller outer end of said housing and having bayonet slots opening through its edge, and lugs projecting diametrically from said housing and engaged in said bayonet slots, said valve cap being accessible for its removal upon the removal of said cover cap from the housing.

References Cited in the file of this patent

UNITED STATES PATENTS

| Number | Name | Date |
|---|---|---|
| 1,406,336 | Bozung | Feb. 14, 1922 |
| 1,428,241 | Kercher | Sept. 5, 1922 |
| 1,582,862 | Zarobsky | Apr. 27, 1926 |
| 1,689,649 | Wagenhorst | Oct. 30, 1928 |
| 1,703,263 | Cutshaw | Feb. 26, 1929 |
| 1,802,877 | Crute | Apr. 28, 1931 |
| 1,858,663 | Frank | May 17, 1932 |
| 2,076,789 | LeJeune | Apr. 13, 1937 |
| 2,475,451 | Gouirand | July 5, 1949 |
| 2,580,343 | Benoit | Dec. 25, 1951 |